Patented Dec. 16, 1941

2,266,422

UNITED STATES PATENT OFFICE 2,266,422

RESISTANCE WELDING ELECTRODE

Franz R. Hensel and Earl I. Larsen, Indianapolis, Ind., assignors to P. R. Mallory & Co., Inc., Indianapolis, Ind., a corporation of Delaware No Drawing. Application July 10, 1940, Serial No. 344,776

2 Claims. (Cl. 219—4)

This invention relates to pressure exerting welding electrodes, used in resistance welding, and a method of making the same.

An object of the invention is to improve pressure exerting welding electrodes and the methods of making same.

Other objects of the invention will be apparent from the following description taken in connection with the appended claims.

The present invention comprises the combination of elements, methods of manufacture, and the product thereof brought out and exemplified in the disclosure hereinafter set forth, the scope of the invention being indicated in the appended claims.

While a preferred embodiment of the invention is described herein, it is contemplated that considerable variation may be made in the method of procedure and the combination of elements without departing from the spirit of the invention.

Heretofore, pressure exerting welding electrodes have been made from melted, cast and wrought copper.

The present invention contemplates the fabrication of pressure exerting welding electrodes for resistance welding purposes by the use of copper powders, by pressing such powders into suitable shapes at room or elevated temperatures, sintering the pressed powder compacts at suitable temperatures, with or without intermediate or subsequent coining or pressing operations.

While copper powder of ordinary commercial purity may be used, it is also possible in some cases to add a small amount of an alloying ingredient such as silver or cadmium in proportions of from .02 to 1% to further harden the powdered composition and raise its annealing temperature. Such additives also make the copper powder composition susceptible to increased cold working without lowering materially the electrical properties of the welding electrodes.

Ordinary commercial copper powder of the usual fineness is suitable for making the electrodes. For example, the grade of copper powder, in which 100% passes a 150 mesh sieve, is satisfactory and also a finer grade in which 100% passes a 400 mesh sieve. It is also possible to make the electrode entirely of copper powder of extreme fineness, the particle size of which varies from a fraction to several microns, by applying an extremely high pressure when molding the electrodes. This results in a very high hardness.

One advantage of making electrodes from pressed copper powder resides in the increase in annealing temperature. A pure wrought copper electrode is completely soft, showing a minus Rockwell B reading after annealing at 300° C. Electrodes made from pure copper powder, after hot pressing and annealing for one hour at 300° C., still retain a Rockwell B hardness of 65 or greater. The hardness only starts to decrease rapidly with increase of the temperature above 300° C. and, in fact, after annealing for one hour at 400° C. the pressed powder material shows a hardness of 22 Rockwell B.

Another advantage of the pressed powder electrodes is the high hardness to which they can be brought. By means of hot pressing the electrode compacts, it is possible to obtain a hardness in a pressed powder electrode made from pure copper powder, of 75 Rockwell B. The average hardness obtainable in hard drawn wrought copper varies from 40 to 55 Rockwell B.

Moreover, as pointed out above, severely cold worked wrought copper anneals very readily while the powder product will withstand considerably higher temperature before a recrystallization or annealing can take place.

The pressed powder electrodes exhibit another unique advantage over wrought materials. In the operation of a welding electrode, the active working tip of the electrode tends to spread or "mushroom" due to the heat and pressure of operation. This necessitates frequent redressing of the tip to bring it back to its original size. We have discovered that when the active working tip of the electrode is formed from pressed copper powder that the tip has self-dressing properties. In other words, as the tip spreads or "mushrooms" the outer portions break off during the welding operation, reducing the tip diameter. With some electrodes, where a tapered tip is used, it may of course still be necessary to dress the tip after a large number of welding operations. However, the self-dressing properties increase the number of spots which can be welded between dressings.

The materials containing silver and cadmium also show very desirable properties. For example, a pressed copper powder electrode containing .1% silver had a Rockwell B hardness of 41 after cold pressing, followed by sintering and a conductivity of 71.8% of that of copper. Another composition having a cadmium content of .3%, balance copper, had a Rockwell B hardness of 60 and a conductivity of 71.8% of that of copper after pressing and sintering.

The electrodes may be formed by charging the powder into a suitably shaped die and applying a suitable pressure, such as 30 tons per square inch after which the pieces are sintered at a suitable sintering temperature, such as 900° C. for one-half hour. Repressing and coining operations may be added after sintering if desired.

Another and preferred method of making the electrodes involves hot pressing of the powder. We have found that if the powder is pressed hot, i. e. in a die, heated to a temperature of the order of 300 to 450 degrees C., that greater densities per ton of pressure can be obtained than with cold pressing and that the hot pressed powders can be pressed into more intricate shapes than when cold pressed. It is also found that where two or more powders of different composition are mixed, such as where small proportions of other metals are added to copper powder, that the heat and pressure incident to hot pressing appear to produce substantially instantaneous diffusion and alloying of the component metals in the case of metals having comparatively low melting points such as below 1150 degrees C. The hot pressed material also can be produced at a hardness exceeding that of cold worked cast and wrought metal.

In hot pressing, however, we have discovered that it is important to introduce a step in the procedure of reducing the copper oxides that are apparently formed on the surface of the copper powder. The following procedures have been found satisfactory:

The copper powder is reduced by heating in an atmosphere of hydrogen to a temperature of about 325 degrees C. for one hour after which it is immediately pressed cold into bars of substantially the desired dimensions at a moderate pressure such as twenty tons per square inch. In one series of experiments it was found that twenty tons per square inch gave a pressed density of 6.4 grams per c. c. for the copper powder. After cold pressing the pressed bar is repressed in a die heated to an elevated temperature such as 450 degrees C., the pressed bar also being heated to this temperature. A higher pressure such as 80 tons per square inch is used during the hot pressing.

According to a slightly modified method the ball-milled copper powder is pressed cold at a moderate pressure such as twenty tons per square inch and the cold pressed bar is then heated in hydrogen for approximately one-half hour at an elevated temperature such as 550 degrees C. or even higher. The bar is then hot pressed at 450 degrees C. as previously described.

While the present invention, as to its objects and advantages, has been described herein as carried out in specific embodiments thereof, it is not desired to be limited thereby but it is intended to cover the invention broadly within the spirit and scope of the appended claims.

What is claimed is:

1. A pressure exerting resistance welding electrode having a working tip formed of a compact body of copper powder sinter-bonded into a hard integral unit.

2. A pressure exerting welding electrode having a working tip formed of copper powder integrally bonded together, and characterized by a hardness exceeding that of wrought copper and further characterized by the ability to retain its hardness substantially undiminished at higher temperatures than wrought copper will withstand without undergoing substantial softening.

FRANZ R. HENSEL.
EARL I. LARSEN.